United States Patent [19]

Burgdorf

[11] Patent Number: 5,152,586
[45] Date of Patent: Oct. 6, 1992

[54] ANTI-LOCKING HYDRAULIC BRAKE SYSTEM

[75] Inventor: Jochen Burgdorf, Offenbach-Rumpenheim, Fed. Rep. of Germany

[73] Assignee: Alfred Teves GmbH, Frankfurt am Main, Fed. Rep. of Germany

[21] Appl. No.: 614,333

[22] Filed: Nov. 16, 1990

[30] Foreign Application Priority Data

Dec. 5, 1989 [DE] Fed. Rep. of Germany ....... 3940177

[51] Int. Cl.$^5$ .......................... B60T 8/32; B60T 8/46; B60T 8/48
[52] U.S. Cl. ............... 303/113 TR; 303/10; 303/115 PP; 303/116 R; 303/119 R; 303/DIG. 5
[58] Field of Search .............. 303/116, 119, 113, 110, 303/100, 93, 115, 10, 68, 119 R, DIG. 5, 113 R, 113 TR, 113 TB, 114 PN, 115 R, 115 PP, 115 FM, 115 VM, 116 R, 116 SP, 116 WP, 116 PC; 188/181 A, 181 R; 180/197; 60/413

[56] References Cited

U.S. PATENT DOCUMENTS

| | | | |
|---|---|---|---|
| 3,521,934 | 7/1970 | Leiber | 303/119 |
| 3,550,966 | 12/1970 | Leiber | 303/119 |
| 3,715,145 | 2/1973 | Harned et al. | 303/116 |
| 3,756,666 | 9/1973 | Leiber | 303/116 X |
| 4,099,793 | 7/1978 | Iio | 303/116 |
| 4,640,558 | 2/1987 | Nomura et al. | 303/119 |
| 4,715,667 | 12/1987 | Otsuki et al. | |
| 4,775,196 | 10/1988 | Braschel et al. | 303/6.01 X |
| 4,778,222 | 10/1988 | Numata et al. | 303/116 X |
| 4,807,943 | 2/1989 | Ogiho | 303/113 TR |
| 4,844,558 | 7/1989 | Ishii et al. | 303/116 X |
| 4,878,715 | 11/1989 | Toda | 303/116 X |
| 4,894,555 | 1/1990 | Watanabe et al. | 303/113 TR |
| 4,898,430 | 2/1990 | Becker-Endrigkeit et al. | 303/113 TR |
| 4,900,102 | 2/1990 | Jonner et al. | 303/116 X |
| 4,900,105 | 2/1990 | Burgdorf et al. | 303/113 TR |
| 4,902,077 | 2/1990 | Belart et al. | 303/113 R |
| 4,940,293 | 7/1990 | Burckhardt et al. | 303/116 X |
| 4,950,038 | 8/1990 | Ocvirk et al. | 303/113 TR |
| 4,952,002 | 8/1990 | Arikawa et al. | 303/116 |
| 4,976,501 | 12/1990 | Sivulka et al. | 303/119 X |
| 5,007,687 | 4/1991 | Kircher et al. | 303/113 R |
| 5,013,095 | 5/1991 | Reinecke | 303/115 PP |
| 5,013,097 | 5/1991 | Gutzeit et al. | 303/116 |
| 5,033,800 | 7/1991 | Willmann | 303/116 RX |
| 5,058,961 | 10/1991 | Mergenthaler et al. | 303/115 PP |

FOREIGN PATENT DOCUMENTS

| | | |
|---|---|---|
| 3541742 | 5/1987 | Fed. Rep. of Germany . |
| 3612185 | 10/1987 | Fed. Rep. of Germany . |
| 3844246 | 7/1989 | Fed. Rep. of Germany . |
| 0160751 | 10/1982 | Japan ........................ 303/116 R |
| 2111149 | 6/1983 | United Kingdom . |
| 2195724 | 4/1988 | United Kingdom . |
| 2199385 | 7/1988 | United Kingdom . |
| 2214250 | 8/1989 | United Kingdom . |
| 2218479 | 11/1989 | United Kingdom . |
| 2224089 | 4/1990 | United Kingdom . |
| 2238836 | 6/1991 | United Kingdom ........... 303/113 TR |

*Primary Examiner*—Douglas C. Butler
*Attorney, Agent, or Firm*—Robert P. Seitter; J. Gordon Lewis

[57] ABSTRACT

An ALC-system of the closed type is provided, with a throttle (27) switched in response to the filling level of the intermediate reservoir (9) inserted into the intake conduit between the intermediate reservoir (9) and a pump (10). This ensures damping of the pressure pulsation of the pedal and further ensures operation of the brake system for traction slip control operation.

4 Claims, 1 Drawing Sheet

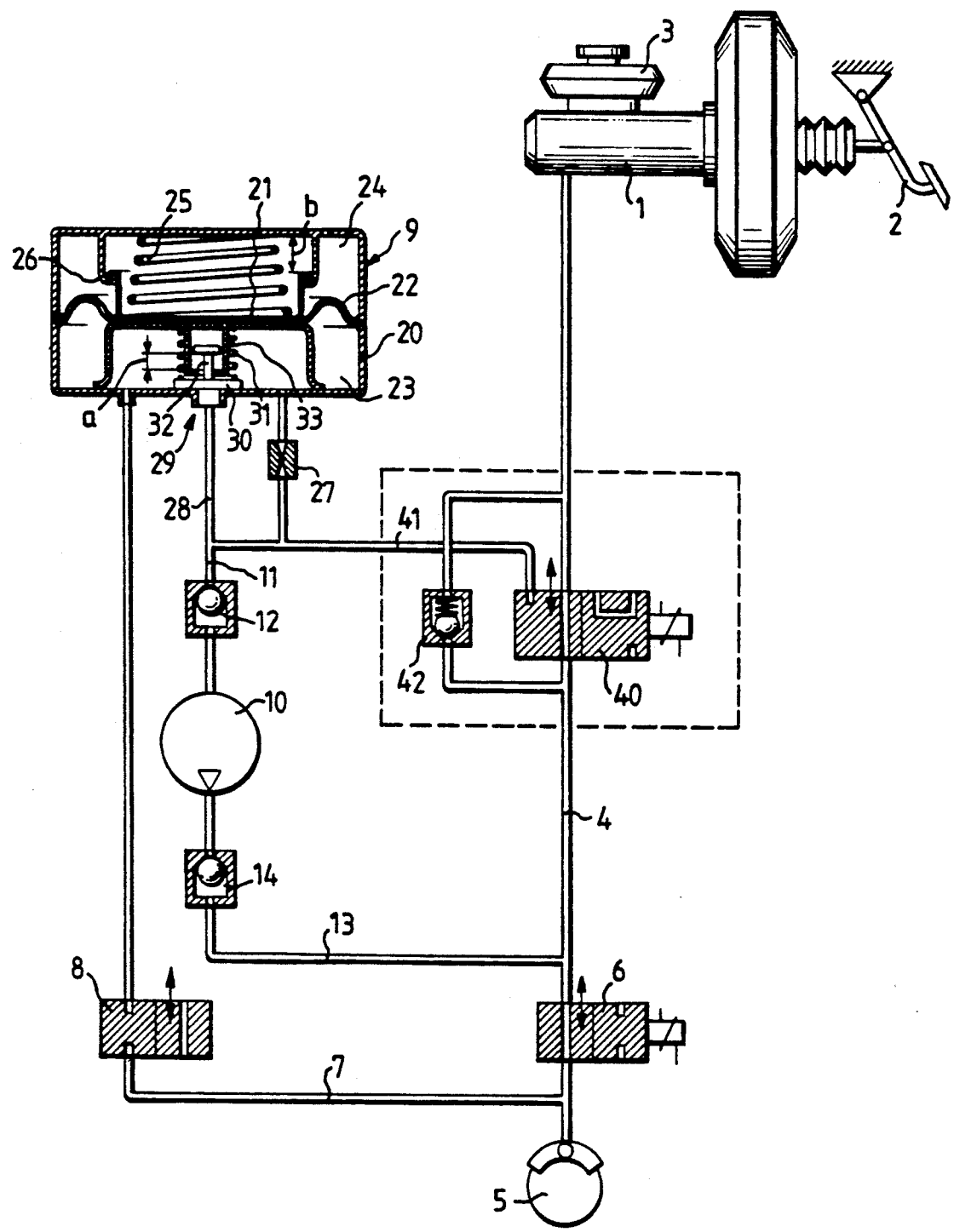

ANTI-LOCKING HYDRAULIC BRAKE SYSTEM

The present invention relates to an anti-locking hydraulic brake system of the type comprising a master cylinder, at least one wheel brake and an accumulator. The wheel brake communicates with the master cylinder through a brake conduit with an inlet valve inserted therein, and with an intermediate reservoir through a return conduit inserted therein. A pump delivers the pressure fluid from the intermediate reservoir into the brake circuit.

A brake system of this type is disclosed in German patent document DOS 36 12 185. That system enables the pressure in the wheel brakes to be controlled in response to the rotating pattern of the wheel. For that purpose, inlet and outlet valves are actuated. For building up pressure, the inlet valve is opened and the outlet valve closed, while for decreasing the pressure, the outlet valve is opened and the inlet valve is blocked. In the latter described condition, pressure fluid flows from the wheel brakes into the intermediate accumulator from where it is returned, through a pump, into the brake conduit and, hence, to the master brake cylinder. During a brake pressure control, pressure fluid is thus permanently discharged from and supplied to the master brake cylinder which exhibits a heavy pulsation of the pedal. According to the noted patent document, it is suggested, therefore, to insert throttles into the pressure conduits of the pump, which are intended to attenuate the pedal pulsation.

However, once a brake system of this type is employed to compensate excessive driving torque through build-up of a brake torque (traction slip control TSC) such throttles may impede a rapid pressure build-up. Moreover, in brake systems of the closed type as described in the noted patent document, a problem is encountered in that torques are applied to the pump when it is operative without taking pressure fluid in. This condition occurs if there is no pressure decrease phase for an extended period of time, with a resulting vacuum being formed in the pump casing causing ingress of air into the brake system. This problem arises, in particular, in cases where pumps which otherwise automatically take in pressure fluid are not employed as are required by TSC-systems.

It is, therefore, an object of the present invention to damp the pressure pulsation of the pedal and, at the same time, to ensure operation of the brake system for traction slip control operation. Moreover, a bubble-free condition of the pressure fluid should be ensured.

SUMMARY OF THE INVENTION

This object is achieved in accordance with the present invention wherein a throttle is provided in the intake line of the pump, and wherein the same effect is attained as by a corresponding throttle in the pressure conduit. By reducing the intake cross-section, the danger of an ingress of air into the brake system is eliminated. Once a significantly large amount of pressure fluid is in the intermediate accumulator, the blocking valve is opened to permit a rapid formation of a pressure fluid reserve volume in the master brake cylinder.

The brake system is rendered suitable for TSC-operation with the aid of a switch-over valve connecting the master cylinder to the intake line of the pump, that is, between the said pump and the throttle valve. Accordingly, the throttle is not effective during a TSC-process operation.

BRIEF DESCRIPTION OF THE DRAWING

One embodiment for explaining the underlying principle of the invention will now be described in conjunction with the accompanying drawing wherein the single figure illustrates a brake system in accordance with the principle of the present invention.

DETAILED DESCRIPTION

The brake system comprises a master brake cylinder 1, such as a tandem master cylinder actuated by means of a pedal. Connected to the master brake cylinder 1 is a pressure fluid reservoir 3 in pressure fluid communication with the master brake cylinder when the pedal is not actuated. A brake conduit 4 leads from the master brake cylinder 1 to the wheel brake 5. An inlet valve 6 is provided in the brake conduit which is electromagnetically operated and is open in the basic position thereof. The wheel brake 5, moreover, is in communication with the intermediate accumulators 9 through a return conduit 7. Inserted into the return conduit 7 is an outlet valve 8 which is electromagnetically operated and blocked in its basic position.

In addition, the brake system includes an automatic intake pump 10 which, with the intake conduit 11 thereof, is in communication with the intermediate reservoir 9. Inserted into the intake line 11 is an intake valve (check valve) opening toward the pump. The pump, through a pressure conduit 13, delivers into the brake conduit 4 between the master cylinder and the inlet valve 6. Located in the pressure conduit 13 is a pressure valve (check valve) 14 blocking over the pump.

The intermediate container 9 comprises a casing 20 including a partition 21 attached by means of a roller diaphragm 22 to the casing 20 and subdividing the same into two compartments, that is, the accumulator chamber 23 and the atmospheric chamber 24. Both the return conduit 7 and the intake conduit 11 terminate in the accumulator chamber 23 forcing the return volume by way of the intermediate reservoir. The atmospheric chamber 24 is in permanent communication with the ambient air.

A spring 25 is located in the atmospheric chamber 24 which is supported on the partition 22 and on the lid of the casing 20, maintaining the partition 22 against a stop 26 defining the minimum volume of the accumulator chamber 23. A throttle 27 is inserted into the intake conduit 11, with a blockable bypass conduit being provided in parallel to the throttle 27. The conduit 28 is controlled by the blocking valve 29 actuated by the partition 21. The valve body 30 of the valve 29 is sealingly seated on a central bore in the bottom of the casing 20. In addition, the valve body 30 exhibits a plunger 32 including a head protruding into a cup connected to the partition 21. The bottom of the cup and the head are spaced from one another by a distance "a". Once the partition 21 moves against the force of the spring 25 in enlarging the accumulator chamber 23, the bottom of the cup, after a distance a being covered, seizes the head of the plunger 32, lifting the valve body 30 from its seat, thereby establishing an unthrottled communication between the accumulator chamber 23 and the intake side of the pump 10. A valve spring 31 is supported both on the partition 21 and on the valve body 30, securely keeping the valve body 30 on its sealing seat as long as it is not entrained by the partition.

Once the brake system is also used for controlling the brake slip, a switchover valve (TSC-valve) 40 is provided which is located in the brake conduit 4. Once the valve 40 is reswitched, the brake conduit 4 is blocked and the master brake cylinder 1 is connected to a connecting line 41 leading to the intake conduit 11. The connecting line 41 terminates between the throttle 27 and the pressure valve 12 in the intake line 11. The brake conduit sections above and below the reswitch valve 40 are interconnected through a release valve 42 opening toward the master brake cylinder 1. The traction slip control valve is electromagnetically actuated and, in the basic position thereof, keeps the brake conduit 4 open. The release valve is arranged so as to enable pressure to be built up in the pressure conduit, which is adequate to decelerate the driven wheel sufficiently. The brake system as described operates as follows: In the basic position, all valves are in the illustrated positions. The pump is switched off. Upon actuation of the pedal 2, pressure fluid is displaced from the master brake cylinder 1, through the brake conduit 4, to the wheel brake, to cause a brake pressure to be built up which results in a wheel deceleration and, hence, in a decleration of the automotive vehicle. The rotating pattern of the wheel is permanently monitored by a sensor (not shown) the signals of which are evaluated by an electronic analyzer (not shown). The unit detects whether the wheel is excessively decelerated or tends to lock, in which case the system switches into the anti-locking mode (ALC-mode), which means that the drive of the pump 10 is switched on and valves 6 and 8 are actuated. The inlet valve 6 blocks the brake conduit, and the outlet valve 8 opens the return conduit causing pressure fluid to flow from the wheel brake into the intermediate reservoir 9 to result in a pressure decrease in the wheel brake.

Normally, it takes a finite period of time before the pump has reached its full discharge capacity. During that time, the intermediate reservoir 9 is filled, thereby causing the partition 21 to displace by distance a. The valve 29 is opened so that the pump 10, through the bypass conduit 28 unimpededly takes in and delivers pressure fluid into the brake conduit 4. This means that a sufficient amount of fluid pressure always is in the brake conduit system so that upon interruption of the ALC-mode, an adequate fluid pressure volume is available to generate, by actuation of the pedal, a corresponding pressure in the wheel brake.

After a certain period of time, the pump reaches its full discharge capacity so that the intermediate reservoir does not attain its full filling level and the pump takes in pressure fluid through the throttle 27, which will substantially reduce the above-mentioned pedal pulsation. The inlet and outlet valves 6, 8 are actuated by the electronic analyzer in accordance with a scheduled algorithm, thereby adjusting an optimum pressure value in the wheel brake enabling the transmission of maximum brake forces being tier and roadway under high lateral guiding forces. Upon completion of a deceleration process, through a short-time actuation of the valve 8, the return conduit 7 and the intermediate reservoir 9 is rendered non-pressurized.

The described brake system in accordance with the present invention also builds up a brake pressure independently of a pedal actuation. This is required for compensating an excessive driving torque which would result in racing of the driving wheels by a corresponding brake torque. Upon occurrence of such a condition, which can be detected by known wheel sensors, the system will switch to the TSC-mode, which means that in addition to exciting of the pump drive and actuating of the inlet and outlet valves, a switchover of valve 40 will take place, thereby causing the brake conduit 4 to be blocked and the master brake cylinder 1 to be connected to the intake line 11. The pump 10 will then discharge pressure fluid from the reservoir 3 which, with pedal 2 non-actuated, is in communication with the master brake cylinder and deliver such pressure fluid to the wheel brake. This is a particularly quick process as the throttle 27 is is not provided in the flow path. Through alternate actuation of the valves 6 and 8, it is possible, as it is in the ALC-mode, to adjust an optimum slip valve permitting the transmission of maximum driving forces at high lateral guiding forces.

What is claimed is:

1. An anti-locking and traction slip hydraulic brake system comprising:
   at least one hydraulically operated wheel brake;
   a master cylinder;
   hydraulic circuit means connecting said master cylinder to said wheel brake for operating said wheel brake;
   a brake pedal connected to said master cylinder to allow stroking of said master cylinder to operate said wheel brake;
   a pump having an inlet and an outlet, said outlet connected in said hydraulic circuit means to said wheel brake;
   an electrically operated inlet valve connected in said hydraulic circuit means to enable controlled closing communication between said wheel brake and both said master cylinder and said outlet of said pump;
   a return conduit connected to said wheel brake at a point in said hydraulic circuit means intermediate said inlet valve and said wheel brake;
   an accumulator including an expansible accumulator chamber connected by said hydraulic circuit means to be able to receive fluid out flow from said wheel brake via said return conduit;
   an electrically operated outlet valve connected in said return conduit to enable controlled closing of said return conduit;
   means connecting said accumulator chamber to said inlet of said pump, said last mentioned means including a first, substantially unrestricted passage, and a second passage having a throttle restriction therein; and,
   valve means opening said first passage upon a filling of said accumulator chamber to a predetermined level enable substantially unrestricted communication of said accumulator chamber with said pump inlet when said predetermined level is reached, and closing communication whenever said chamber is not filled to said predetermined level to substantially restrict communication between said chamber and said pump inlet.

2. An anti-locking hydraulic brake system according to claim 1 further including an additional conduit connecting said pump inlet to said master cylinder and a second electrically operated valve means in said additional conduit enabling communication of said pump inlet with said master cylinder in the event of traction slip control of said wheel brake to enable unrestricted intake of fluid into said pump.

3. An anti-locking hydraulic brake system according to claim 2 wherein said second valve means also cuts off communication of said master cylinder with said wheel brake whereby said pump can rapidly operate said wheel brake.

4. An anti-locking and traction slip hydraulic brake system comprising:

at least one hydraulically operated wheel brake;

a master cylinder;

hydraulic circuit means connecting said master cylinder to said wheel brake for operating said wheel brake;

a brake pedal connected to said master cylinder to allow stroking of said master cylinder to operate said wheel brake;

a pump having an inlet and an outlet, said outlet connected in said hydraulic circuit means to said wheel brake;

an electrically operated inlet valve connected in said hydraulic circuit means to enable controlled closing of communication between said wheel brake and both said master cylinder and said outlet of said pump;

a return conduit connected to said wheel brake at a point in said hydraulic circuit means intermediate said inlet valve and said wheel brake;

an accumulator including an expansible accumulator chamber connected by said hydraulic circuit means able to receive fluid out flow from said wheel brake via said return conduit;

an electrically operated outlet valve connected in said return conduit to enable controlled closing of said return conduit;

means connecting said accumulator chamber to said inlet of said pump, said last mentioned means including a passage having a throttle restriction therein substantially restricting fluid flow therethrough; a bypass conduit directly connecting said pump inlet to said master cylinder; and, electrically operated valve means in said bypass conduit opening said bypass conduit to enable substantially unrestricted communication of said master cylinder with said pump inlet whenever traction slip brake operation is activated, and closing said bypass conduit whenever said traction slip brake is not operated.

* * * * *